United States Patent [11] 3,627,660

[72] Inventor John B. Siddal
 Palo Alto, Calif.
[21] Appl. No. 883,301
[22] Filed Dec. 8, 1969
[45] Patented Dec. 14, 1971
[73] Assignee Zoecon Corporation
 Palo Alto, Calif.

[54] PHOTOCHEMICAL PREPARATION OF A
 BICYCLIC LACTONE
 6 Claims, No Drawings
[52] U.S. Cl...................................................... 204/162 R,
 260/343
[51] Int. Cl......................................................... B01j 1/10
[50] Field of Search............................................ 260/343;
 204/158, 162

[56] References Cited
 OTHER REFERENCES
 Chapman, Organic Photochemistry, Vol. I (1967) pages 307 & 309.

Primary Examiner—Howard S. Williams
Attorney—Donald W. Erickson

ABSTRACT: Synthesis of cis 2-(1'-methyl-2'-isopropenyl-cyclobutyl)ethanol, a component of the boll weevil sex attractant, and intermediates therefor, in which 5-hydroxy-pent-2-ynoic acid ester or ethers thereof is methylated followed by cyclization to yield 3-methylpent-2-eno-5-lactone which is irradiated in presence of ethylene to yield 2,3-cycloethylene-3-methylpentano-5-lactone which is cleaved and converted into 2-(1'-methyl-2'-isopropenylcyclobutyl)ethanol.

PHOTOCHEMICAL PREPARATION OF A BICYCLIC LACTONE

The present invention relates to the synthesis of cis 2-(1'-methyl-2'-isopropenylcyclobutyl)ethanol, one of three essential components of the male boll weevil's sex attractant, and intermediates therefor. The components of the male boll weevil's sex attractant have been reported at *Chemical & Engineering News*, 36–38, Apr. 28, 1969 and *Science* 166, 1010, Nov. 21, 1969.

It is an object of the present invention to provide a synthesis for the preparation of cis 2-(1'-methyl-2'-isopropenylcyclobutyl)ethanol and key intermediates therefor which uses readily available starting materials and is economical to practice. Other objects and advantages will become apparent as the invention is hereinafter described in detail.

In the practice of the invention, there is first prepared the lactone III (3-methylpent-2-eno-5-lactone) which is outlined as follows:

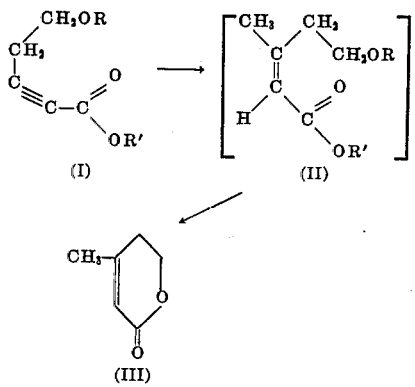

In the above formulas, R represents hydrogen or an acid labile group, such as tetrahydropyran-2-yl, tetrahydrofuran-2yl, t-butyl, and the like, and R' represents lower alkyl, cycloalkyl, aralkyl or aryl.

The lactone (III), a key intermediate, in accordance with the present invention is prepared by first methylating the acetylenic ester (I) and then converting the intermediate (II) into the lactone (III). Advantageously, the process can be carried out in one reaction vessel. Methylation of 5-hydroxypent-2-ynoic acid ester (I) or the ether thereof is accomplished by treatment with dimethylcopper lithium in an organic solvent inert to the reaction. There is used at least one molar equivalent of dimethylcopper lithium or a slight excess. The preparation of the dimethylcopper lithium reagent is carried out at low temperatures of the order of about room temperature to about −150° C., preferably from about 0° C. to about −100° C. in an organic solvent medium inert to the reaction, such as ethers, hydrocarbons, and the like, e.g., pentane, ether, tetrahydrofuran, monoglyme, toluene, diglyme and dioxane; and mixtures thereof, such as ether:pentane, ether:hexane, and the like. Instead of isolating the dimethylcopper lithium reagent, it is preferable to add the acetylenic ester (I) to the prepared solution of the reagent while maintaining a low temperature and preferably under inert atmosphere, such as argon or nitrogen. The reaction is complete in a matter of minutes to a few hours depending primarily on the solvent medium. The intermediate (II) is then, preferably without isolation, converted into the lactone (III). To accomplish this conversion, the intermediate ester (II) is hydrolyzed to the free acid which is then cyclized to the lactone (III) by treatment with a proton donor, such as an inorganic acid or organic acid. Hydrolysis of the ester to the free acid is accomplished by treatment with a base, such as an alkali metal hydroxide, alkali metal bicarbonate, alkali metal carbonate, or an alkaline earth metal hydroxide, e.g. sodium hydroxide, potassium hydroxide, sodium bicarbonate, barium hydroxide, potassium bicarbonate, sodium carbonate, potassium carbonate, and the like, preferably an alkali metal. The base should be present in the amount of at least one molar equivalent. The hydrolysis is usually conducted at about room temperature; although, lower or higher temperatures, such as reflux, may be used depending on such factors as the nature of the ester moiety and base employed. A suitable method is to add a solution of the base in a lower alcohol, such as methanol or ethanol, upon completion of the methylation reaction. After hydrolysis of the ester is complete, the reaction mixture is then made acid by the addition of a proton donor and agitated. A proton donor, such as an inorganic or organic acid, such as hydrochloric acid, sulfuric acid, phosphoric acid, oxalic acid, acetic acid, p-toluenesulfonic acid, preferably dilute aqueous acid, such as aqueous hydrochloric acid or aqueous sulfuric acid. If the hydroxyl group of the acetylenic ester (I) bears an ether group, the choice of proton donor will depend upon the relative ease with which the ether group is removed. In the case of an intermediate of formula II wherein R' is t-butyl, it is not necessary to treat the intermediate with base to hydrolyze the ester. In this case, hydrolysis of the t-butyl ester, removal of labile ether group R, if present, and cyclization can be accomplished by treatment with a proton donor alone. In this method, it is preferably to use a strong acid, such as hydrochloric acid, perchloric acid, p-toluenesulfonic acid, trifluoroacetic acid, sulfuric acid, and the like. Depending upon such factors as the miscibility of the acid with the solvent medium of the previous step and the acid used, the acid may be added as a aqueous solution, with or without organic solvent carrier or in concentrated form without dilution. The acid treatment is generally done at room temperature with stirring, although lower or higher temperatures, such as 0° C. to reflux, may be beneficial depending on such factors as the particular acid used, solvent medium and the time within which it is desired to complete the reactions. For example, in the case of trifluoroacetic acid, it is preferable to work at about 0° C. The lactone can be used as the crude product or purified by distillation prior to irradiation with ethylene.

Methylation of the acetylenic ester (I) in accordance with the present invention can also be accomplished using methyl copper or a complex formed from the reaction of cuprous salt with methylmagnesium halide, i.e. bromide, chloride, or iodide. Cuprous salt, such as cuprous iodide, cuprous bromide, cuprous chloride, cuprous acetate or cuprous cyanide is generally used. Methyl copper is prepared using equimolar amounts of a cuprous salt, such as cuprous iodide, and methyl lithium. Similarly, the complex formed from cuprous salt and methyl-magnesium halide is prepared using equimolar amounts. In such instance and particularly in the case of methyl copper, it is advantageous to employ a solubilizing ligand, such as tertiary phosphine, tertiary phosphite, secondary amine or tertiary amine to improve the organic solvent solubility and reactivity of the reagent. Suitable ligands include tri-n-butyl phosphine, triethylphosphite, pyrrolidine, piperadine, trimethylphosphine, diethylamine, and the like. The ligand should be present in the amount of at least 1 molar equivalent based on the cuprous salt employed in the reaction mixture; however, in the case of the complex formed from cuprous salt and methylmagnesium halide, 2 molar equivalents of the ligand should be employed. Preparation of the methylation reagent is accomplished using the conditions and procedure described hereinabove for the preparation of dimethylcopper lithium.

The lactone (III) is then treated with ethylene under photochemical addition conditions to yield the 2,3-cycloethylene-3-methylpentano-5-lactone (IV).

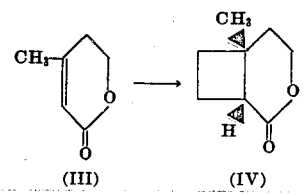

Photochemical addition of ethylene to the lactone (III) is accomplished by irradiating a solution of the lactone (III) in an organic solvent inert to the reaction which is saturated with ethylene. Suitable inert organic solvents include ethers, alcohols, halogenated hydrocarbons and hydrocarbons, such as ether, tetrahydrofuran, benzene, hexane, cyclohexane. Depending upon the concentration of the reaction solution, temperature, solvent and light source, the reaction is complete within a few minutes to several hours. Suitable sources of light include sunlight and electric light means, such as conventional fluorescent light, mercury arc light, and the like. The effective wavelength appears to be in the UV range of from about 200 mu. to about 400 mu. Filters, such as Pyrex and quartz, may be used in conjunction with sensitizers, such as acetophenone, benzophenone, and the like. The photochemical addition can be carried out at room temperature, although higher and lower temperatures can be employed, generally temperatures below room temperature are used. The concentration of the lactone (III) in the solvent medium should always be considerably less than the concentration of ethylene, generally less than 5 percent.

The lactone (IV) is then cleaved and converted into cis (1'-methyl-2'-isopropenylcyclobutyl)ethanol according to the following outlined procedure.

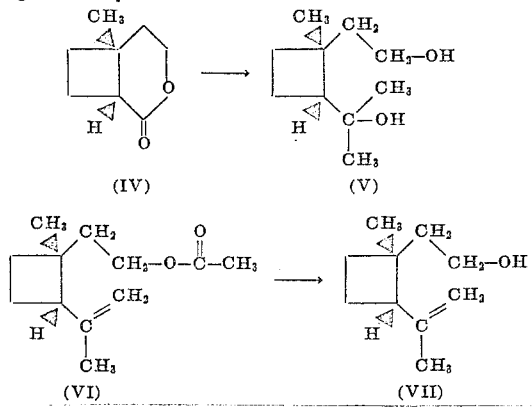

In the practice of the above process, the lactone (IV) is reacted with methyl lithium in ether to yield the diol (V) which is treated with acetic anhydride with heat to yield the acetate (VI). Hydrolysis of the acetate using alkali metal hydroxide, or the like, in alcohol affords the desired alcohol (VII).

The compounds of formula I wherein R is an acid labile group, such as tetrahydropyran-2-yl, tetrahydrofuran-2-yl or t-butyl, can be prepared by standard procedures. Tetrahydropyran-2-yl ether and tetrahydrofuran-2-yl ether can be prepared by treating the hydroxyl compound with dihydropyran and dihydrofuran, respectively, in the presence of hydrochloric acid. The t-butyl ether can be prepared by treating the hydroxyl compound with isobutene in the presence of sulfuric acid.

The term "lower alkyl," as used herein, refers to an alkyl group of one to six carbon atoms, straight and branched chain, such as methyl, ethyl, n-propyl and t-butyl. The term "cycloalkyl," as used herein, refers to a cycloalkyl group of four to eight carbon atoms. The term "aralkyl," as used herein, refers to an aralkyl group of up to 10 carbon atoms, such as phenyl, naphthyl, tolyl, ethylphenyl and t-butylphenyl. Suitable procedures for preparation of acetylenic acid esters are set forth at CA 40:7157 (1946); CA 41:705 (1947); R. A. Raphael, "Acetylenic Compounds in Organic Synthesis," Butterworth & Co., London (1955); and A. W. Johnson, "The Chemistry of the Acetylenic Compounds," Vol. II, London (1950).

The following examples are provided to illustrate the present invention. Temperature in degrees centigrade.

EXAMPLE 1

To a mixture of 950 mg. of cuprous iodide in 10 ml. of dry tetrahydrofuran is added at −20° in an argon atmosphere, 5.9 ml. of a 1.67 M ethereal methyl lithium solution.

To the above prepared solution is added a solution of 550 mg. of methyl 5-hydroxypent-2-ynoate in 2 ml. of tetrahydrofuran. After about 2 hours, 1 ml. of water is added and the mixture allowed to rise to room temperature. To the mixture is added 2 equivalents of aqueous sodium hydroxide in methanol and the mixture stirred at room temperature until the ester disappears (about 26 hours). Then, there is added aqueous hydrochloric acid with stirring until the mixture is acidic. When cyclization is complete, as followed by thin-layer chromatography, the mixture is saturated with brine and then extracted with ether. The ether extracts are washed with brine and water and dried over sodium sulfate. The solvent is evaporated under reduced pressure to yield 3-methylpent-2-eno-5-lactone (III) which can be purified by distillation.

EXAMPLE 2

A solution of 1 g. of 3-methylpent-2-eno-5-lactone in 50 g. of benzene is saturated with ethylene. The solution, while continuing to introduce ethylene, is irradiated using a medium-pressure mercury vapor lamp (450 watts) with Pyrex filter for about 4 hours. Then the reaction mixture is evaporated under reduced pressure to yield 2,3-cycloethylene-3-methylpentano-5-lactone (IV) which can be purified by distillation.

EXAMPLE 3

To a solution of 1 g. of 2,3-cycloethylene-3-methylpentano-5-lactone in ether is added 2 molar equivalents of methyl lithium in ether with stirring at about 0°. The mixture is stirred for about 60 minutes and allowed to rise to room temperature. The mixture is diluted with aqueous ammonium chloride and water and separated. The organic phase is washed with water, dried over sodium sulfate and evaporated under reduced pressure to yield the diol (V) which can be purified by distillation.

A mixture of 1 g. of the diol (V) and 5 ml. of acetic anhydride is heated at reflux for about 2 hours. The mixture is cooled and diluted with saturated NaCl water and then ether. The organic phase is washed with brine and water, dried over sodium sulfate and evaporated under reduced pressure to yield the acetate (VI).

A mixture of 1 g. of the acetate (VI) and 0.1 g. of potassium hydroxide in methanol is stirred for about 2.5 hours. The mixture is diluted with water and then ether. The organic phase is washed with water, dried over sodium sulfate and evaporated to yield the monohydric alcohol (VII) which can be purified by distillation.

EXAMPLE 4

A mixture of 0.5 moles of 5-hydroxypent-2-ynoic acid, 2.0 moles of isobutylene, about 0.3 ml. of concentrated sulfuric acid and 50 ml. of methylene chloride is stirred at −10° to 0° for about 24 hours. The cold reaction mixture is poured into cold dilute aqueous sodium bicarbonate with stirring and separated. The organic phase is washed with water, dried over magnesium sulfate and solvent removed under reduced pressure to yield t-butyl-5-t-butoxypent-2-ynoate.

To a mixture of 950 mg. of cuprous iodide in 80 ml. of dry tetrahydrofuran is added at −20° in an argon atmosphere, 5.9 ml. of a 1.67 M ethereal methyl lithium solution.

To the above-prepared solution is added at −78° a solution of 560 mg. of t-butyl-5-t-butoxypent-2-ynoate in 20 ml. of tetrahydrofuran. After about 2 hours, 1 ml. of water is added and the mixture allowed to rise to room temperature. To the mixture is added aqueous perchloric acid until acidic. The mixture is then refluxed until cyclization is complete as followed by thin-layer chromatography. The cooled mixture is diluted with brine and then extracted with ether. The ether extracts are washed with brine and water, dried over sodium sulfate and solvent removed by evaporation. The residue is distilled to yield 3-methylpent-2-eno-5-lactone (III).

EXAMPLE 5

To a mixture of 950 mg. of cuprous iodide and 1 molar equivalent of pyrrolidine in 50 ml. of dry ether is added at −50° in argon atmosphere 2.95 ml. of a 1.67 molar ethereal methyl lithium solution.

After about 30 minutes, there is added 550 mg. of methyl 5-(tetrahydropyran-2'-yloxy)pent-2-ynoate in 20 ml. of ether at −78° with stirring. After about 1 hour, 1 ml. of water is added and the mixture allowed to rise to room temperature. To the mixture is added 1.5 equivalents of aqueous potassium hydroxide in methanol and the mixture stirred at room temperature until the ester disappears. The mixture is then made acidic by the addition of p-toluenesulfonic acid and stirred with heating until cyclization complete as followed by thin-layer chromatography. The reaction mixture is then worked up as described in example 1 to yield the lactone (III).

EXAMPLE 6

This example illustrates hydrolysis of the ester by generation of the base in situ.

To a mixture of 950 mg. of cuprous iodide in 10 ml. of dry tetrahydrofuran is added at −20°, in an argon atmosphere, 5.9 ml. of a 1.67 M ethereal methyl lithium solution.

To the above-prepared solution is added a solution of 550 mg. of methyl 5-hydroxypent-2-ynoate in 2 ml. of tetrahydrofuran. After about two hours, 1 ml. of water is added and the mixture allowed to rise to room temperature. 4 ml. of ethyl alcohol is added and the mixture stirred at room temperature. After about 10 hours, there is added aqueous hydrochloric acid with stirring until the mixture is acidic. When cyclization is complete, as followed by thin-layer chromatography, the mixture is saturated with brine and then extracted with ether. The ether extracts are washed with brine and water and dried over sodium sulfate. The solvent is evaporated under reduced pressure to yield 3-methylpent-2-eno-5-lactone (III) which is purified by distillation.

The above process is repeated with the exception that instead of adding 1 ml. of water and allowing the mixture to rise to room temperature, 4 ml. of ethanol is added directly and then stirring at room temperature to yield the lactone (III).

The procedure of this example illustrates the generation of base in situ, i.e., lithium hydroxide, which advantageously eliminates the addition of base as a separate step. Similarly, magnesium hydroxide can be generated in situ when using the methylating reagent formed from the reaction of cuprous salt and methylmagnesium halide.

What is claimed is:

1. A process for the preparation of a bicyclic lactone of the formula:

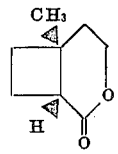

which comprises the methylation of an acetylenic acid ester of the formula:

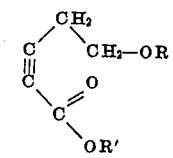

wherein R is hydrogen or an acid labile group and R' is lower alkyl, cycloalkyl, aralkyl or aryl, with at least 1 molar equivalent of a methylating reagent selected from dimethylcopper lithium, methyl copper and a complex formed from the reaction of at least equimolar amounts of cuprous salt and methylmagnesium halide in an organic solvent inert to the reaction, followed by hydrolysis of the ester group of the thus-obtained intermediate by treatment with base, and cyclization of the thus-obtained free acid by treatment with acid to yield a monocyclic lactone of the formula:

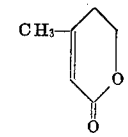

and irradiating a solution of the monocyclic lactone in an organic solvent inert to the reaction saturated with ethylene to yield said bicyclic lactone.

2. The process according to claim 1 wherein R is hydrogen and R' is lower alkyl.

3. The process according to claim 2 wherein R' is methyl.

4. The process according to claim 1 wherein R is tetrahydropyran-2-yl and R' is lower alkyl.

5. The process according to claim 4 wherein R' is methyl.

6. The process according to claim 1 wherein the acetylenic ester is methyl 5-hydroxypent-2-ynoate, the methylating reagent is dimethylcopper lithium, the base is aqueous sodium hydroxide and said cyclization is accomplished using aqueous inorganic acid.

* * * * *